(12) United States Patent
Pham (10) Patent No.: US 12,474,753 B1
(45) Date of Patent: Nov. 18, 2025

(54) DISTRIBUTED COORDINATION OF GATING ON PARALLEL POWER SUPPLIES

(71) Applicant: Amazon Technologies, Inc., Reno, NV (US)

(72) Inventor: Hoang Pham, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 0 days.

(21) Appl. No.: 18/109,160

(22) Filed: Feb. 13, 2023

(51) Int. Cl.
*G06F 1/26* (2006.01)
*G06F 15/177* (2006.01)
*H02J 1/10* (2006.01)

(52) U.S. Cl.
CPC ............ *G06F 1/263* (2013.01); *G06F 15/177* (2013.01); *H02J 1/106* (2020.01); *H02J 1/109* (2020.01)

(58) Field of Classification Search
CPC .......... G06F 1/263; G06F 1/28; G06F 15/177; H02J 1/106; H02J 1/109
See application file for complete search history.

(56) References Cited

U.S. PATENT DOCUMENTS

| | | | | |
|---|---|---|---|---|
| 6,324,161 B1* | 11/2001 | Kirch | ...................... | H04L 45/28 709/239 |
| 6,735,704 B1* | 5/2004 | Butka | ...................... | H02J 3/38 713/340 |
| 2005/0043859 A1* | 2/2005 | Tsai | .......................... | H02J 3/46 307/65 |
| 2007/0217128 A1* | 9/2007 | Johnson, Jr. | ......... | H05K 7/1492 361/622 |
| 2012/0119586 A1* | 5/2012 | Carralero | .................. | H02J 7/34 307/82 |
| 2013/0181528 A1* | 7/2013 | Colombi | ................. | H02J 9/062 307/65 |
| 2013/0187471 A1* | 7/2013 | Kim | ...................... | H02J 7/0068 307/66 |
| 2014/0160814 A1* | 6/2014 | Morimoto | ........... | H02M 3/1584 363/65 |
| 2014/0258573 A1* | 9/2014 | Johnson | ............ | H04L 12/40084 710/110 |
| 2018/0205259 A1* | 7/2018 | Yamamoto | .............. | H02J 50/12 |
| 2020/0127463 A1* | 4/2020 | Humphrey | .......... | G06F 9/30087 |
| 2020/0251924 A1* | 8/2020 | Mohr | ........................ | G06F 1/26 |
| 2024/0006880 A1* | 1/2024 | Makitani | ................. | H02J 1/106 |
| 2024/0087638 A1* | 3/2024 | Matsumoto | ............ | G11C 16/32 |

* cited by examiner

*Primary Examiner* — Thomas J. Cleary
(74) *Attorney, Agent, or Firm* — Hogan Lovells US LLP (57) ABSTRACT

A system including controller devices to be associated together by a communication bus and to be associated with multiple power supply units (PSUs) to provide power parallelly to a computer environment is disclosed. The controller devices are to communicate with each other based on at least one of the controller devices winning an arbitration to send at least one packet having a timing indicator through the communication bus to the controller devices. The PSUs provide the power for the computer environment based on the timing indicator.

20 Claims, 6 Drawing Sheets

DISTRIBUTED COORDINATION OF GATING ON PARALLEL POWER SUPPLIES

BACKGROUND

A computer environment may include rows of server racks or cabinets having multiple servers within each such server racks or cabinets. Further, to provide power to the computer environment, power shelves having multiple power supply units (PSUs) are provided to be operated in parallel. Within a power shelf, the PSUs may receive turn-on instructions independently. A process of coordinating turn-on of all the PSUs is referred to as peer gating. However, when the PSUs do not turn on at the same time, the PSUs that turn on first would be overloaded and enter a fault state.

BRIEF DESCRIPTION OF THE DRAWINGS

Embodiments herein will be described with reference to the drawings, in which.

DETAILED DESCRIPTION

Systems and methods in accordance with at least one embodiment herein overcome one or more of the above-described deficiencies and other deficiencies in approaches to providing power parallelly to a computer environment using power supply units (PSUs). To coordinate timely provisioning of power from PSUs having such a parallel association, to power a computer environment, each PSU may be made to follow a scheme supported by a common communication protocol. The computer environment may include computers within server racks in a datacenter. In at least one embodiment, the scheme includes providing a common communication bus for the PSUs to enable the common communication protocol. This is so that the PSUs are not controlled by a central controlling mechanism. Instead, each PSU of the parallelly-associated PSUs can make an autonomous decision based at least in part on telemetry received in each PSU from the common communication bus. The scheme at least removes possible points of failure, such as those that might exist in peer gating schemes which rely on a central controller to turn on all PSUs at the same time.

In at least one embodiment, the system to address failures in peer gating schemes that rely on a central controlling mechanism includes a number of PSUs to parallelly provide power for a computer environment. The PSUs have independent controller devices that may include a processor and that include a communications controller. The independent controller devices are associated with a communication controller or with a randomizer and a clock synchronizer. Further, individual controller devices are within individual PSUs to support communication between each other through a communication bus that is accessible to all the controller devices. There may be other groups of PSUs, where each group is part of a respective communication bus.

Such communication through a communication bus, in a group, may be based at least in part on at least one of the individual controller devices winning an arbitration to send a communication having at least one packet with a timing indicator therein through the communication bus to all the controller devices. The PSUs are to provide the power to a computer environment based in part on the timing indicator. In doing so, all the controller devices are informed of a time point (such as, from the timing indicator) from which to count down prior to providing power. All the controller devices can cause their respective PSUs to provide power within a threshold of the end of the countdown or at the end of the countdown.

In at least one embodiment, the controller devices are to be associated together by the communication bus and are to be associated with PSUs that can power a computer environment. Individual PSUs in such an arrangement can parallelly provide power for a computer environment based in part on a timing indicator provided to the controller devices from at least one of the controller devices. The controller devices are to communicate with each other based at least in part on at least one of the controller devices winning an arbitration to send at least one packet having a timing indicator through the communication bus to the remaining controller devices. The PSUs can then provide the power based in part on the timing indicator.

In at least one embodiment, the PSUs, through their respective controller devices, can broadcast a heartbeat with a status word at a predetermined time, such as every second. The controller devices of all the PSUs can check for the presences of a neighbor by listening for the status word. The controller devices of the all the PSUs can check for errors in the system through the heartbeat message. Further, the controller devices of all the PSUs can synchronize with each other through at least the reception of the status word message. For example, a time quanta can be determined by a clock synchronizer scaled from an oscillator provided to a processor having a clock synchronizer.

In at least one embodiment, an independent clock synchronizer may be used without a processor. In at least one embodiment, the processor or clock synchronizer may be at a different frequency and can be adjusted by a programmable scalar. In at least one embodiment, independent processors or clock synchronizers, of the PSUs of a group of PSUs, can use a receipt of a status word message from one PSU's controller device to synchronize a time across all the PSUs to be used with a timing indicator. This enables all the PSUs to count down from a time associated with the timing indicator and to provide power at the same time or substantially the same time.

Further, a frame or a message, interchangeably used with a packet, is in reference to streams of bits used for communication among controller devices of different PSUs. A packet may include a status word message (with a start of frame (SOF) bit) that can be used for time synchronization amongst the PSUs. The packet may also include data, such as a timing indicator or other data that each PSU generates and broadcasts (or attempts to broadcast) to cause a delay to all the PSUs for synchronization power provisioning to a computer environment. For example, the data includes or represents an automated random value for a delay to be applied to each PSU prior to the PSU providing the power to a computer environment. The data or representation from a controller device, as a result of an arbitration, on a communication bus can be used to delay all PSUs to turn on at the same time Various other functions and advantages are described and suggested below as may be provided in accordance with at least one embodiment herein. In the description herein, at least one embodiment may be described and performed according to the disclosure herein. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
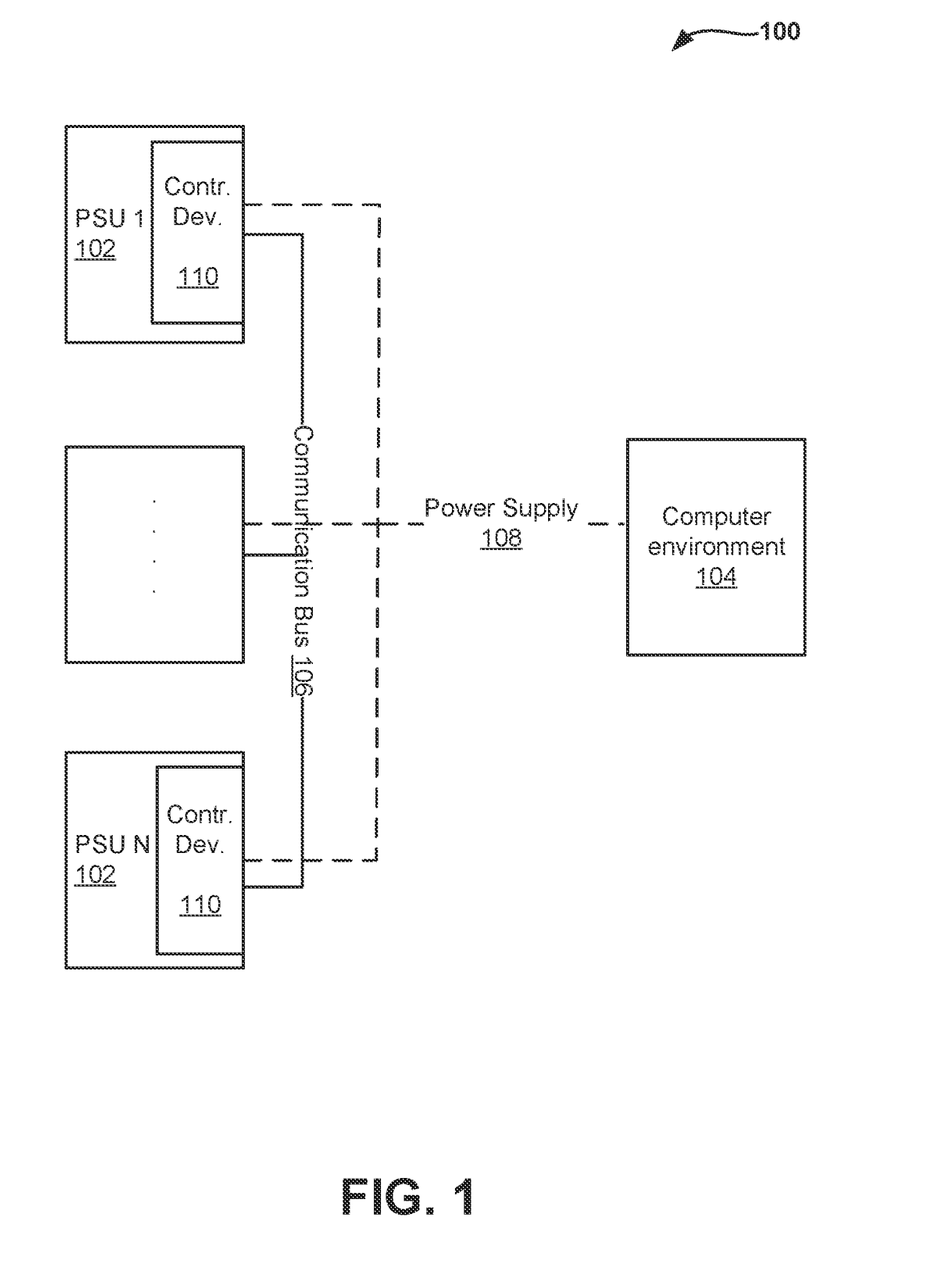
FIG. 1 illustrates a block diagram of a system for gating parallel power supply units (PSUs) in accordance with at least one embodiment.

FIG. 1 illustrates a block diagram of a system 100 for gating parallel power supply units (PSUs) in accordance with at least one embodiment. In some cases, the components of system 100 are arranged within a server rack. The system 100 includes PSUs 1-N 102 that are adapted to provide power parallelly for a computer environment 104 using supporting cables 108. Each of the PSUs 1-N 102 include a controller device 110. Further, each controller device 110 of each of the PSUs 1-N 102 can include a communications controller to communicate via a communication bus 106. In at least one embodiment, the communications controller may be adapted with an arbitration-supported communication protocol, such as a controller area network (CAN) protocol for the communications via the communication bus 106. In at least one embodiment, discussions herein pertaining to the controller device 110 may be generally described as having processes being performed by a PSU 102 and are understood, based in part on a function being performed (processing, random number generation, clock, communication, etc.), as belonging to components within a controller device 110 or the PSU itself (such as providing the power) unless expressly stated otherwise.

In at least one embodiment, therefore, the controller devices 110 are associated together by a communication bus 106 and are associated with the PSUs 102 to be able to control power provisioning aspects of the PSUs 102. For example, while a bank or group of PSUs may be indicated to start together, the system and method herein enable the PSUs in each bank or group to parallelly provide power for a computer environment. For example, the controller devices 110 of the PSUs 102 are adapted to communicate with each other to perform error checking and to determine a time from which to count down before the controller devices 110 of the PSUs cause their respective PSUs to provide the power. As a result, the PSUs that are associated together and are ready to provide power can at least provide the power parallelly for a computer environment 104 without any one specific PSU 102 being overloaded.

In at least one embodiment, the communication between the controller devices 110 may be based at least in part on one of the controller devices 110 winning an arbitration to send at least one packet having or representing a timing indicator through the communication bus 106 to the remaining controller devices that can also include the sending controller device. For example, the sending controller device can switch to a listening mode after broadcasting its packet for arbitration. The controller devices 110 can transmit, as part of the arbitration, data having or representing a timing indicator in a packet.

Figure 2:
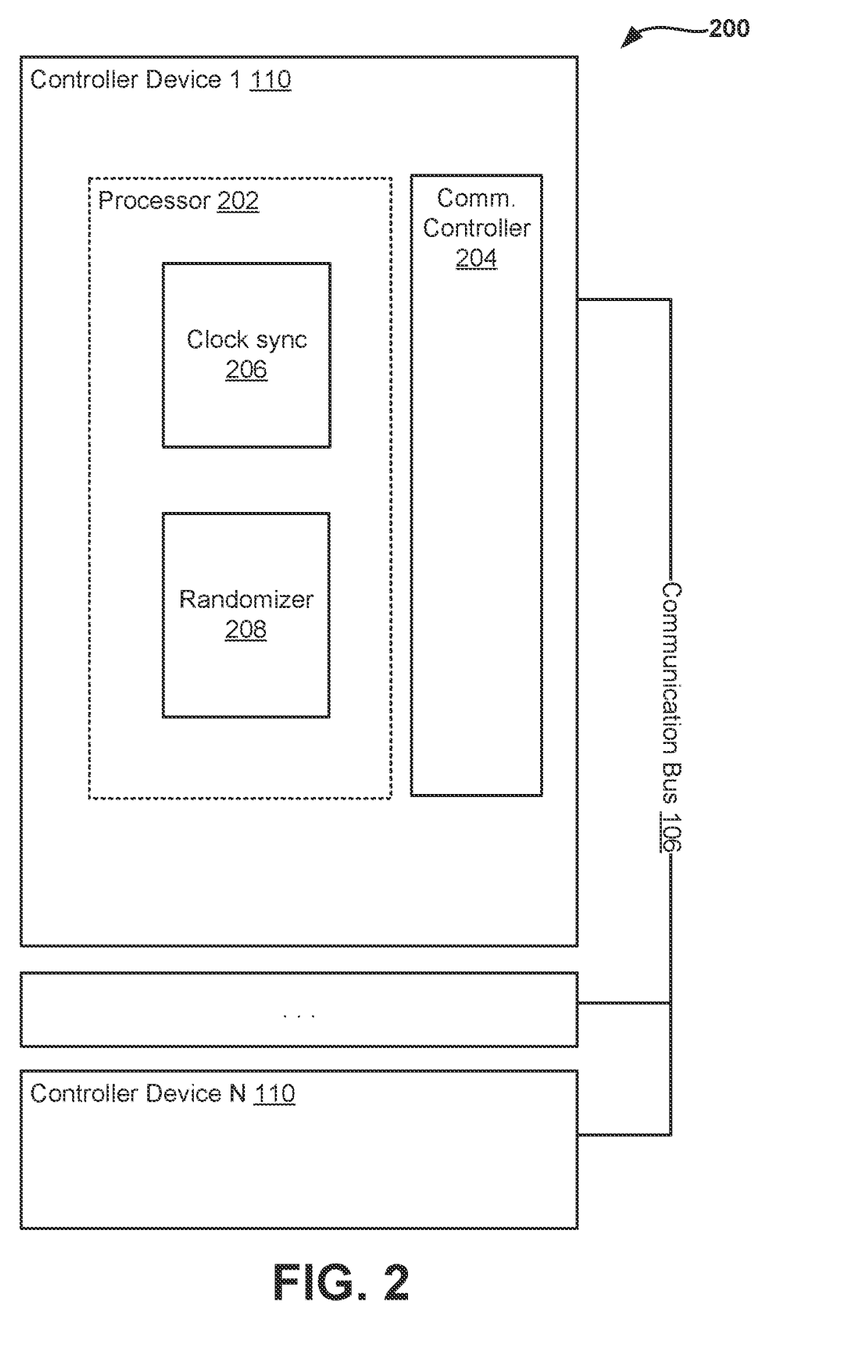
FIG. 2 illustrates a block diagram of a controller device used for gating parallel power supply units (PSUs) in accordance with at least one embodiment.

FIG. 2 illustrates a block diagram 200 of a controller device 110 used for gating parallel PSUs in accordance with at least one embodiment. The block diagram 200 illustrates that each controller device 110 may include a processor 202 to couple with a communications controller 204, where the communications controller 204 is adapted to support an arbitration-based communications protocol, such as a CAN protocol. The communications controller 204 can therefore function using priority arbitration, such as by a dominant (0 bit or winning) device controller 110 having priority to communicate on a communication bus 106, with a recessive (1 bit or losing) communications controller operating in a listening mode.

In at least one embodiment, the listening mode allows each controller device 110 of each PSU 102 to be informed regarding a win or a loss of the arbitration relative to other controller devices 110. For example, each controller device 110 can send a message having an identifier (such as a 11-bit value to identify a frame or a message) through the communication bus 106. The identifier may include a dominant value or a recessive value or a mix of such values in each of the 11 bits. In line with the CAN protocol, arbitration is required because the communication bus 106 is a multi-master bus configuration and does not allow one PSU to control the communication till the PSU wins arbitration. Therefore, at least initially and after periods of dominance till a period of idle, any PSU can attempt to transmit at any time.

In an example, the PSUs 102 can start in a broadcast mode and can attempt to transmit simultaneously upon detecting that the communication bus 106 is idle. However, to do so, each controller device 110 has to provide a message for the communication bus 106 using a different message or frame identifier (such as, a 11-bit value included in the frame information 304 of a frame 300 in FIG. 3). The transmission from the multiple PSUs 110 may therefore occur almost at the same time. The message identifiers may be based in part on preprogrammed priority for each message associated with a type of message or other aspect, in each controller device 110. Therefore, the identifiers can change for each message transmitted. There may be 211 or 2048 different identifiers available for the messages or frames based on the 11 individual bits available to the identifiers. After transmitting in a broadcast mode, the PSUs 102 switch to a listening mode to monitor a state of the communication bus 106.

As a result of using different identifiers, at least one PSU may transmit a lower numbered message identifier that may be analogous with a dominant PSU annotation under the CAN protocol. Other PSUs may transmit a higher number message identifier that may be analogous with a recessive PSU annotation under the CAN protocol. Further the communication bus 106 is a wired-AND bus with a dominant bit designation of the communication bus 106 represented by a "0" bit value and a recessive bit designation of the communication bus 106 represented by a "1" bit value. A PSU with message identifier that is a dominant PSU annotation and that is coincidental with a dominant bit designation of the communication bus 106 will be the only PSU to be allowed to transmit.

In at least one embodiment, a bit designation of the communication bus 106 will be dominant in case any number of the PSUs provide a message at a dominant PSU annotation. The communication bus 106 will, however, be recessive in case all of the PSUs provide a message at a recessive PSU annotation. Each of the PSUs 110 transmits a bit of their message or frame identifier and then verifies if the transmitted bit is of the same bit value of the bit designation of the communication bus 106.

In a case where a PSU determines, by its controller device 110, that the transmitted bit is not of the same bit value of the bit designation of the communication bus 106, a further verification can be made as to whether the transmitted bit was a dominant bit value. In case it was not a dominant bit value (such as a recessive value) and because of the different PSU annotation for the transmitted bit that is not coincidental with a bit designation of the communication bus 106, the PSU transmitting such a bit switches to a listening mode. An error might be noted to restart transmission if a dominant bit value was transmitted by the PSU transmitting, but when such dominant bit value is not coincidental with a recessive bit designation of the communication bus 106.

In a case where a PSU determines, by its controller device 110, that the transmitted bit is the same bit value of the bit designation of the communication bus 106, a further verification can be made as to whether all arbitration bits (such as all of the 11-bit message or frame identifier) have been transmitted. In a case where there are more arbitration bits to transmit, the above verifications must be repeated till the arbitration bits (such as all of the 11 bits) are exhausted and so, at least one PSU can end with a transmitted bit that is a dominant bit value and that is coincidental with a dominant bit designation of the communication bus 106. At that point, the at least one PSU takes control of the communication bus 106 and transmits the rest of its data (that is or that represents a timing indicator) while the other PSUs associated with the communication bus 106 switch to listening mode.

In the listening mode, the PSUs 110 already transmitting a message with a recessive identifier will immediately quit the arbitration process and become a receiver instead. The arbitration is therefore performed over all of the arbitration bits; and when all such bits have been sent, at least one PSU may be left on the communication bus 106 to be the dominant PSU and the winner of the arbitration. The dominant PSU left therefore continues its transmission with the data in its message or frame. In at least one embodiment, therefore, an identifier having zeros in the 11-bit identifier is a highest priority message on the communication bus 106. This is at least because it can hold the bus dominant for the longest time because each 0-bit in the 11 bits is used to determine priority. When two PSUs try to transmit simultaneously, a PSU that sends a last identifier bit as a dominant bit (0 bit) retains control, while other PSUs sending a recessive bit do not have control, and so the PSU with the dominant bit can complete its message each time. Dominant bits, therefore, always overwrite a recessive bit on a communication bus 106 according to the CAN protocol.

In at least one embodiment, the identifier is therefore unique within the PSUs of the communication bus 106 and can be associated with the content being transmitted and can define the priority based on the content. For example, as detailed with respect to FIG. 3, for a heartbeat content, a specific identifier may be used, as is the case for content pertaining to network management, fail-safe, synchronous message, emergency message, time synchronization, and other customizable aspects to provide less or higher priority to each of such content in the message or frames for the system including the PSUs 102. A PSU losing arbitration continues to attempt to send its frame or message till its priority is reached, where it can win arbitration to send. As such, no data is lost by mere loss in an arbitration process for the system including the PSUs 102 herein.

FIG. 2 also illustrates that a randomizer 208 (or random number generator) may be used with the communications controller 204 to enable a timing indicator having or representing a random value (such as in a data field 308 of a frame or message 300 of FIG. 3 or by a delayed response) to be provided through the communication bus 106 to the controller devices 110. For example, a request may be provided from one PSU to win an arbitration requesting a response by other PSUs of the communication bus 106. Then, it is possible to enable at least one other PSU to respond to the request by a random delay, which represents a timing indicator; but it is also possible to enable the response to include a random value as the timing indicator. In at least one embodiment, a randomizer 208 is internal to the communications controller 204 or is distinct from the communications controller 204 (such as part of a processor 202) and may be used to provide the random delay or the random value.

In at least one embodiment, at least one of the individual controller devices 110 that is different from a winner of an arbitration can send a response that is a packet having or representing a timing indicator through a communication bus 106 to the controller devices 110. The at least one packet need not come from the controller device that wins the arbitration but can come from a response of another (responding) controller device using the same priority in its identification. For example, the responding controller device can use a randomized delay, where a time value of the delay (from the sending of the request or from the receipt of the request-such as, by noting that the communication bus is idle after the request has been sent and received) may be used as the timing indicator by the receiving controller devices.

Alternatively, the responding controller device provides a random value in a packet by responding to a request from a winning controller device that is different and that has won the arbitration. Further, for a packet sent with a random delay, the same identifier as the requester indicates that it is a random delay packet and it will be sent with a same priority as the requester, such as described further in connection to at least FIG. 3 herein. Therefore, a controller device 110 to provide the timing indicator may be one that wins an arbitration or one that responds to a request from another controller device that has won the arbitration. In either case, the communication between the controller devices 110 is based at least in part on at least one of the individual controller devices winning an arbitration to send at least one packet having a timing indicator through the communication bus 106 to the controller devices 110. The controller device that sends the packet may also receive the packet.

Further, in at least one embodiment, the randomizer 208 may be limited to a range of random values for the timing indicator. For example, the random values may range from 1 to 30 (and can represent 1 to 30 seconds of delay) so that the receiving controller devices 110 can cause individual PSUs, via its respective processors 202, to count down from whatever the timing indicator is, as received by a randomized delay or within the data field of a packet, and to provide power at the end of or at a threshold from the end of the countdown. In at least one embodiment, a randomized start can therefore occur with a delay of 1 to 30 seconds for PSUs in each row of PSUs. Further, different rows of PSUs belonging to different communication buses can provide power after different randomized delays (but each randomized delay belong to a row and, by extension, to a communication bus) using similar arbitration wins and similar timing indicators provided through their respective communication bus.

The randomizer 208 of a PSU may be used with a clock synchronous 206 module of the PSU to cause a random delay response in at least one other PSU's request to communicate through a communication bus 106 after winning an arbitration. Alternatively, a randomizer 208 of a PSU may be used to provide a random value as a timing indicator for a data field of a packet to be sent to win an arbitration.

In at least one embodiment, there may be three synchronization points representing three different times in which a PSU of a communication bus 106 can indicate readiness to provide power along with the other PSUs of a group. For example, if one PSU is slower, it can indicate a request to delay providing power. This will give the PSU time to catch up using a ready-to-power-ON bit in a priority message through the communication bus 106. The delay to provide power may however last for a limited time, such as a 1 to 2 minutes before the arbitration process is restarted.

In at least one embodiment, a clock synchronous 206 module can be synchronized to a predetermined clock frequency and to cause all the PSUs to be synchronized to the same frequency. Therefore, individual PSUs start up, then determine their own good status, register one or more heartbeats (as detailed with respect to FIG. 3 for all connected PSUs), and then start to arbitrate for a timing indicator. A start of field or frame (SOF) bit of a message associated with the winning PSU may be used by the group of PSUs to synchronize their clocks, whereas a data field can be used to provide or to represent a timing indicator, which can cause simultaneous (or near simultaneous) countdown in respective PSUs. Then power can be provided from all the connected PSUs simultaneously (or near simultaneously) following an end of or following a threshold from the end of the countdown. For the representation of timing indicator, the message having or representing a timing indicator may be provided in response to an arbitration win may be used to cause the countdown to provide power from all the connected PSUs.

In at least one embodiment, the communications controller 204 uses a synchronized clock from the clock synchronous 206 module of a processor 202 or from a distinct hardware or software aspect of the controller device 110. The clock synchronous 206 may be an application level, by a software-implemented algorithm to scale a processor clock or a clock of the controller device 110. In at least one embodiment, the clock synchronous 206 module is able to provide clock synchronous support from one controller device 110 of one PSU to the other PSUs of a communication bus 106 using approaches described in connection to FIG. 3, such as using the SOF bit 302 of a frame or message.

In at least one embodiment, approaches herein preempt an event in which two PSU (such as PSU 1 and PSU 6) 102 broadcast a same priority message at an exact same time. For example, to address this, position information of the PSUs may be used to set up the PSUs 102 for the arbitration. Position identifiers (IDs) may be assigned to each PSU 1-N in a shelf. The positions may be identified in any order, such as PSU 1, 2 . . . . N starting from one side to the other. The PSUs 102 are also assigned a 2-byte message priority ID, which maps into the 11-bit identification field described in reference to FIG. 3. With the above identification differences among the PSUs, in the event that two PSUs (such as the aforementioned example of PSU 1 and PSU 6) broadcast a same priority message at a same time, PSU 1 would win arbitration due to its lower position ID in binary.

Figure 3:
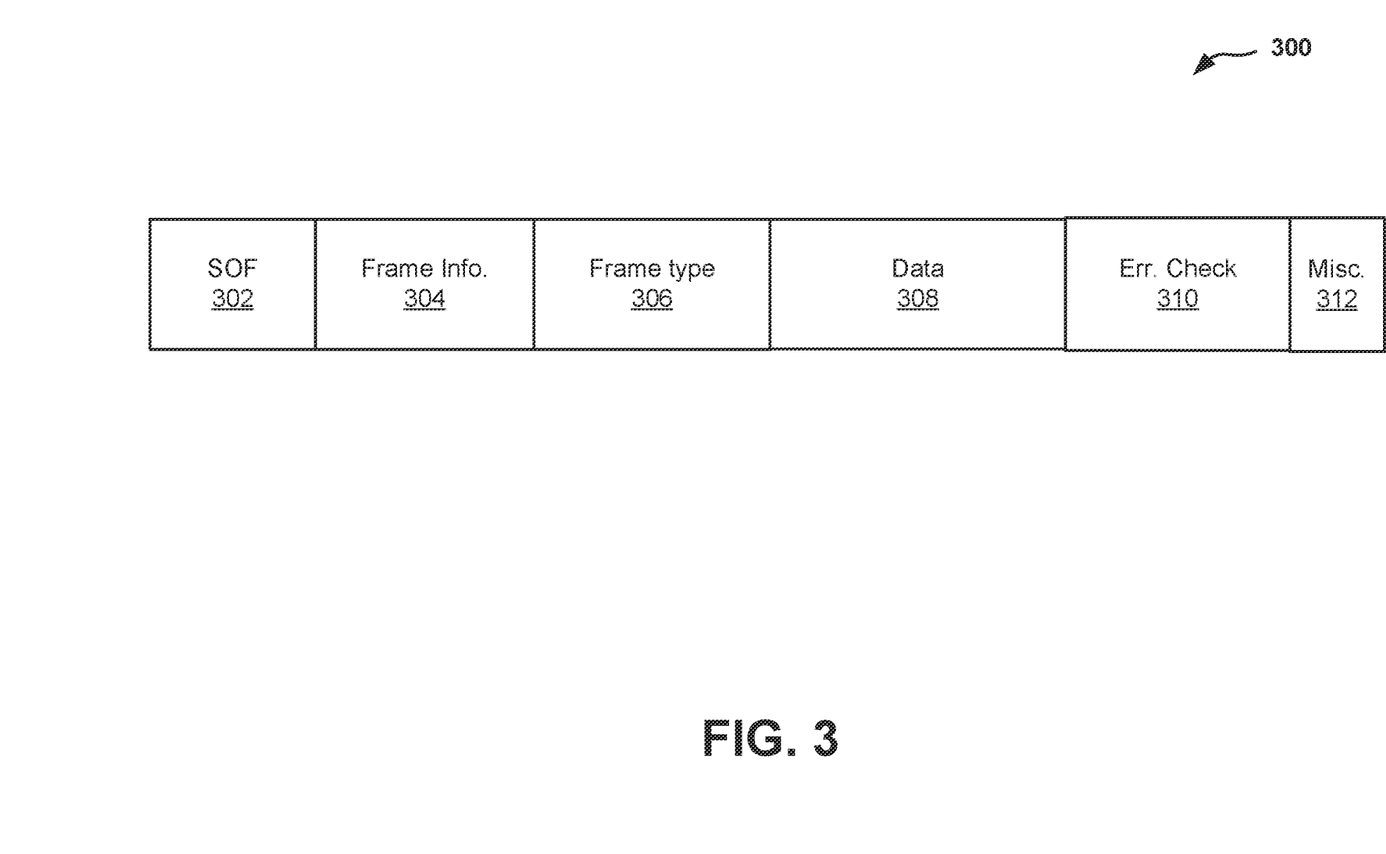
FIG. 3 illustrates a structure of a frame used for communication by a controller device in accordance with at least one embodiment.

FIG. 3 illustrates a structure of a message or frame 300, that forms a packet, used for communication by a controller device 110 in accordance with at least one embodiment. The message or frame 300 includes an SOF bit 302 that may include a dominant bit to indicate start of a message. Further, the SOF bit 302 may be used to synchronize individual timers within the controller devices 110 based in part on an initial communication including the SOF bit 302 sent before the arbitration based in part on a communication associated with the winning of the arbitration between the plurality of controller devices. Therefore, the SOF bit 302 of the dominant or winning PSU may be used to synchronize all the PSUs on a communication bus 106 after each idle time of the communication bus 106 and after winning an arbitration by at least one PSU.

The message or frame 300 includes a 11-bit identification field within the frame information 304 part of the message or frame 300. The 11-bit value may be used to identify each message or frame and may be used in the arbitration, as described at least in connection with FIG. 2. Therefore, the 11-bit value can be used to prioritize frames or messages sent through the communication bus 106. As described in connection to FIG. 2, a 11-bit identification having lower values will have higher priorities.

In at least one embodiment, a heartbeat protocol may be used to inform, by a PSU, its presence to other PSUs of a communication bus 106. The informing PSU may be a heartbeat producer and the listening PSUs may be consumers of the heartbeat. As such, the informing PSU can automatically send its status in predetermined intervals in order to indicate its presence and ability to communicate. The heartbeat can include information such as a PSU identification within the 11-bit identification field. There is a predetermined priority associated with a message or frame providing the heartbeat. An interval between heartbeat messages or frames may also be defined by an object or parameter provided in the identification field.

The message or frame 300 includes a Remote Transit Request (RTR) bit in the frame information 304. This allows differentiation of data and remote frames, where a remote frame may be to request for data and may not include data. The data for a data frame is provided in a data field 308 of the message or frame 300. The RTR bit may be dominant when the message or frame 300 is a data frame and may be a recessive bit when the message or frame 300 is a remote frame. Further, data being returned from a request may have a higher priority (lower identifier) than a frame or message requesting such data. For example, the data being returned may be in a frame or message with a same identifier as the requesting frame or message to ensure that the priority is preserved and the PSU has the communication bus 106 to provide transmission.

The data field 308 allows 0-8 bytes of data and so, up to 8 bytes can be sent in a single frame or message. For remote frames or messages, there may not be data bytes. The message or frame 300 may include error checking 310 fields for a 16-bit Cyclic Redundancy Check (CRC) to be used to detect errors in the frame or packet. Finally, miscellaneous fields 312 in the message or frame 300 can include a 2-bit acknowledge field for a sender PSU to send a recessive value for a first acknowledge bit of the acknowledge field. One or more receiver PSUs can drive the first acknowledge bit to a dominant state to indicate acknowledgment of the bit. In the 2-bit acknowledge field, a second acknowledge bit may be a delimiter and may be driven to a recessive bit by a sender PSU. An end of frame (EOF) bit may be included in each frame or message 300 as part of the miscellaneous fields 312.

In at least one embodiment, a single bit of a frame or message 300 can be associated with different time segments and a time segment can be an integer of time quanta that may be determined by the clock synchronous 206 module provided to the communications controller 204. In at least one embodiment, clock synchronous 206 module may be scaled from a system clock associated with the controller device 110. Further, a time quanta may be a smallest amount of time that a communications controller 204 can adjust a resolution to operate in sync with the other controller devices 110. The communications controller 204 can use bit-transitions starting from the SOF bit for synchronization. Further, resynchronization may be performed at different times using a time segment of a bit of a packet that wins in an arbitration or that provides a timing indicator as this packet may be used for synchronizing all PSUs of the communication bus 106.

Figure 4:
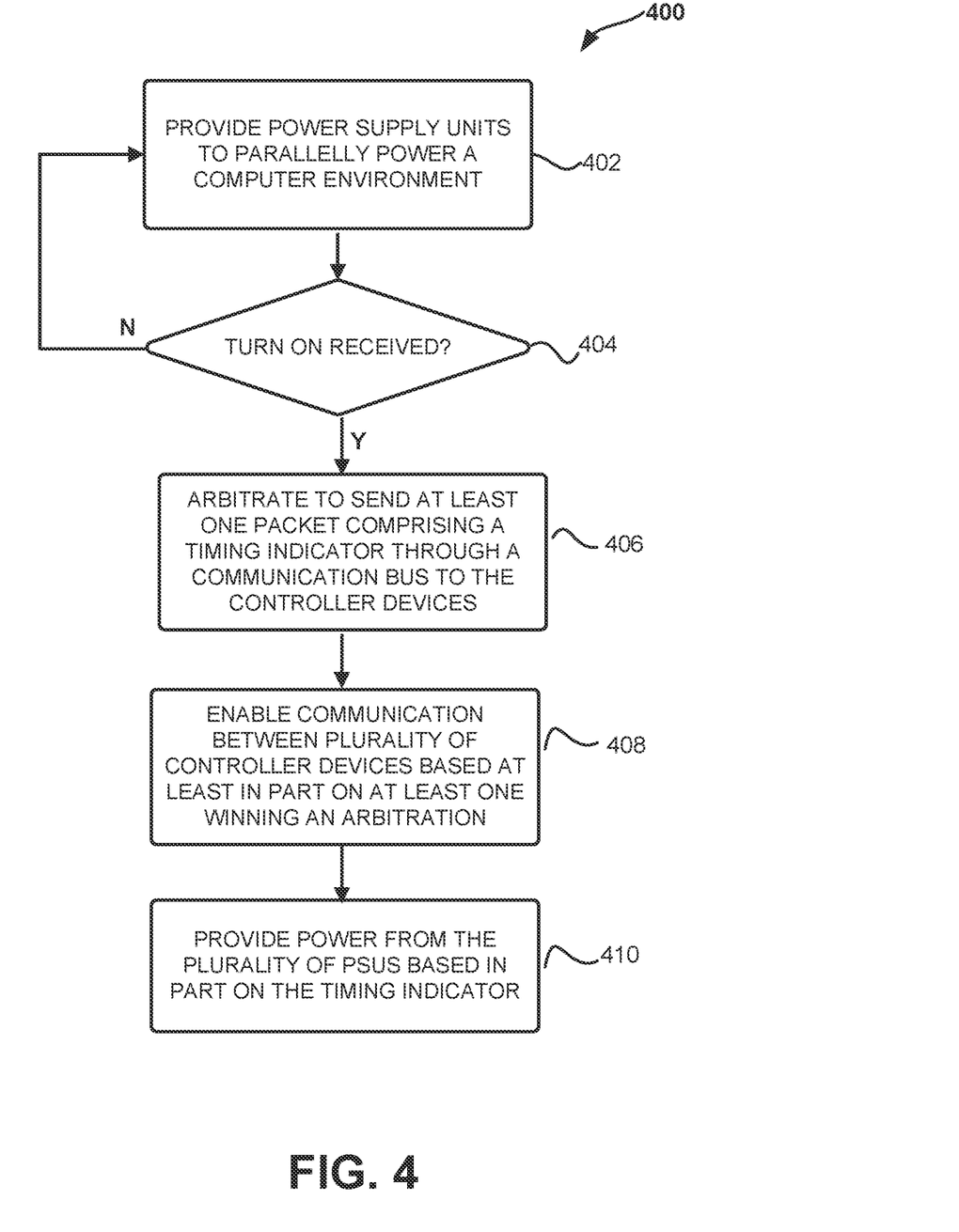
FIG. 4 illustrates a process flow or method used for gating of parallel power supply units (PSUs) in accordance with at least one embodiment.

FIG. 4 illustrates a process flow or method 400 used for gating of parallel power supply units (PSUs) in accordance with at least one embodiment. The process flow or method 400 includes providing (402) multiple PSUs to parallelly power a computer environment. The process flow or method 400 includes verifying (404) that a turn-on, power-on or start-up command is received. In at least one embodiment, this may be received to at least one PSU or to a common power-on controller for a row of PSUs. The process flow or method 400 includes arbitrating (406) to send at least one packet having a timing indicator through a communication bus to the controller devices. As described with respect to one or more of FIGS. 1-3, the arbitration is amongst controller devices of respective PSUs of a group of PSUs seeking to win a chance to communicate through a communication bus to all the PSUs.

In at least one embodiment, the process flow or method 400 includes enabling (408) communication between a number of the controller devices based at least in part on at least one of the controller devices winning an arbitration to send the at least one packet to the controller devices. For example, one of the controller devices that wins the arbitration can change to a listening mode and can receive a packet transmitted through the communication bus. The packet can be associated with a timing indicator, presented by a randomized delay in sending a response packet or by an expressly included random value in a data field of the packet. The packet is received through the communication bus to all the controller devices. Then, individual controller devices within individual PSUs of the plurality of PSUs can use the timing indicator to perform a countdown. The process flow or method 400 includes providing (410) power from the PSUs based in part on the timing indicator, such as using the end of the countdown from the timing indicator or using a threshold from the end of the countdown from the timing indicator.

In at least one embodiment, a processor of a controller device in each PSU can perform the verifying (404) step, whereas a communications controller interfacing with the processor in each controller device performs the arbitrating (406) step. In at least one embodiment, the communications controller of at least one PSU can also perform the enabling (408) step for the communication between the controller devices of the PSUs based on winning the arbitration. Further, the randomized delay or random value in the packet for the communication in the enabling (408) step may be obtained by coordination between a randomizer of the processor of the at least one PSU and the communications controller of the same PSU.

In at least one embodiment, the process flow or method 400 includes using an automated random value as the timing indicator. The timing indicator may be used in the individual controller devices to delay the individual PSUs from providing (410) the power to a computer environment. The providing (410) step may be coordinated by the processor and the and the communications controller of each PSU. While the randomizer of the controller device that may be included within a processor or may be a distinct component that can provide the random value automatically in response to each PSU preparing to provide power, it is an end of the delay from a countdown of the random value (provided to each PSU based on one PSU winning the arbitration) that allows the individual PSUs to provide the power to the computer environment at a substantially same time.

In at least one embodiment, substantially the same time refers to all PSUs capable of starting up and performing the countdown, but also capable of doing so at least within 10 milliseconds from each other or doing so at least within 10 milliseconds from the first PSU providing the power to the computer environment. The 10 milliseconds represent a substantially simultaneous power provisioning feature for the group of PSUs, enabled by the timing indicator.

In at least one embodiment, the process flow or method 400 includes performing a countdown in individual internal clocks of the controller devices based in part on the timing indicator. A clock synchronous module may be used to scale a processor or an external clock for at least one PSU that wins an arbitration. The remaining PSUs may use a synchronizing time of the at least one PSU to have their clock synchronous modules synced to the at least one PSU. In this manner, all the PSUs of a communication bus have a same or substantially same reference point to cause power to be provided to a computer environment. The same or substantially same reference that is within a threshold, such as within 10 milliseconds of each other, from a first PSU providing power to the computer environment till the last PSU providing the power as part of the group of PSUs. Therefore, in at least one embodiment, the process flow or method 400 includes enabling the power to be provided from the individual PSUs at a time that is within a threshold of an end of the countdown.

In at least one embodiment, the process flow or method 400 includes starting the individual PSUs in individual broadcaster modes to transmit individual packets for arbitration in the communication bus at one or more different times relative to each other. For example, even though the PSUs all start-up at nearly the same time, it is more likely that there may be some systemic delays. As a result, all PSUs may start-up with one or more different times. However, the PSUs may perform some broadcasting, including to attempt to become a dominant PSU in a communication bus after the start-up. Then, the PSUs can switch to individual listening modes to monitor for the at least one packet having the timing indicator. In doing so, at least one PSU can win an arbitration, at least one PSU can provide a random timing indicator, and at least one PSU can enable synchronizing before all PSUs are to provide power based in part on the timing indicator. Such at least one PSUs may be different PSUs of the group of PSUs, but may be enabled to perform such aspects based on at least one PSU winning the arbitration.

In at least one embodiment, the process flow or method 400 includes synchronizing individual timers based in part on an initial communication before the arbitration. Alternatively, the process flow or method 400 includes synchronizing individual timers based in part on the communication associated with the winning of the arbitration between the controller devices of the different PSUs. In at least one embodiment, the process flow or method 400 includes using individual randomizers associated with the individual controller devices, such as illustrated and described in connection with at least FIG. 2. The randomizers may be provided to determine individual timing indicators to be within individual packets for the arbitration or to be represented by individual packets for the arbitration. The controller devices can attempt to transmit the individual packets together, on the communication bus, to cause the arbitration.

In at least one embodiment, the process flow or method 400 includes determining that at least one of the plurality of PSUs is in a fault state. When such a fault state is confirmed, including an error from an error checking performed, a determination of a time from which to count down before the controller devices can cause respective PSUs to provide power; however, if one PSU is slower, it can indicate a request to delay providing power or to give it time to catch up via a ready-to-power-ON bit in a priority message through the communication bus 106. The delay to start-up may however last for a limited time, such as a 1 to 2 minutes before the arbitration process is restarted. Therefore, a fault state can result in delaying the arbitration for a threshold period.

Figure 5:
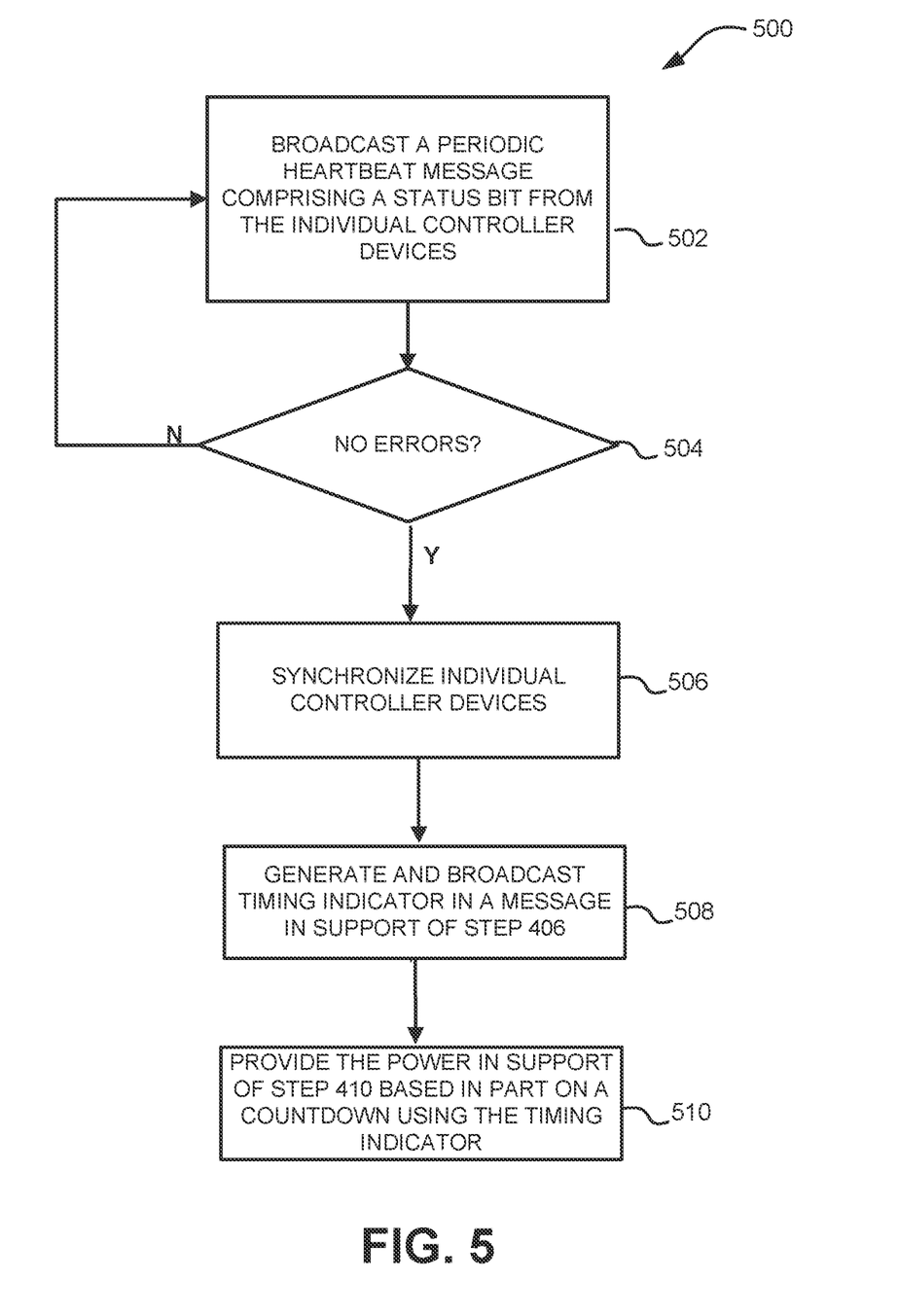
FIG. 5 illustrates a process flow or method for generating and broadcasting a timing indicator as part of gating of parallel power supply units (PSUs) in accordance with at least one embodiment.

FIG. 5 illustrates a process flow or method 500 used for generating and broadcasting a timing indicator as part of gating of parallel power supply units (PSUs) in accordance with at least one embodiment. In at least one embodiment, the process flow or method 500 includes broadcasting (502) a periodic heartbeat message having a status word having multiple bits from the individual controller devices. The individual controller devices can switch to respective listening modes to monitor a presence of other ones of the individual controller devices by monitoring the status word. In at least one embodiment, the process flow or method 500 includes checking (504) for errors in a system based in part on the status word of the periodic heartbeat. This checking (504) for errors also includes an error noted from a receipt or absence of a receipt of the status word. For example, a receipt indicating an error may be by an unexpected delay in the receipt of the heartbeat. In another example, an absence of a receipt may be an obvious indication of an error because of a neighboring PSU being non-responsive.

In at least one embodiment, the process flow or method 500 includes synchronizing (506) individual timers that are in individual PSUs based in part on an initial communication before the arbitration or based in part on the communication associated with the winning of the arbitration between the plurality of controller devices. In at least one embodiment, the process flow or method 500 includes using individual randomizers associated with the individual controller devices to determine individual timing indicators to be included in individual packets for the arbitration. Further, the process flow or method 500 includes generating and broadcasting (508) the timing indicators in packets, including at least the winning packet, from the controller devices that attempt to transmit the individual packets together, on the communication bus, to cause the arbitration. The process flow or method 500 includes providing (510) the power from the PSUs based in part on a countdown from the timing indicator (and may include a threshold from an end of the countdown) by all the PSUs of a combination bus that are functional to provide power.

In at least one embodiment, a communications controller interfacing with a processor in a controller device of each PSU performs the broadcasting (502) step and the checking (504) step. In at least one embodiment, the processor of the controller device in each PSU can perform the synchronizing (506) step. The communications controller of at least one PSU can also perform the generating and broadcasting (508) step for the timing indicator by coordination between a randomizer of the processor of the at least one PSU and the communications controller of the same PSU.

Figure 6:
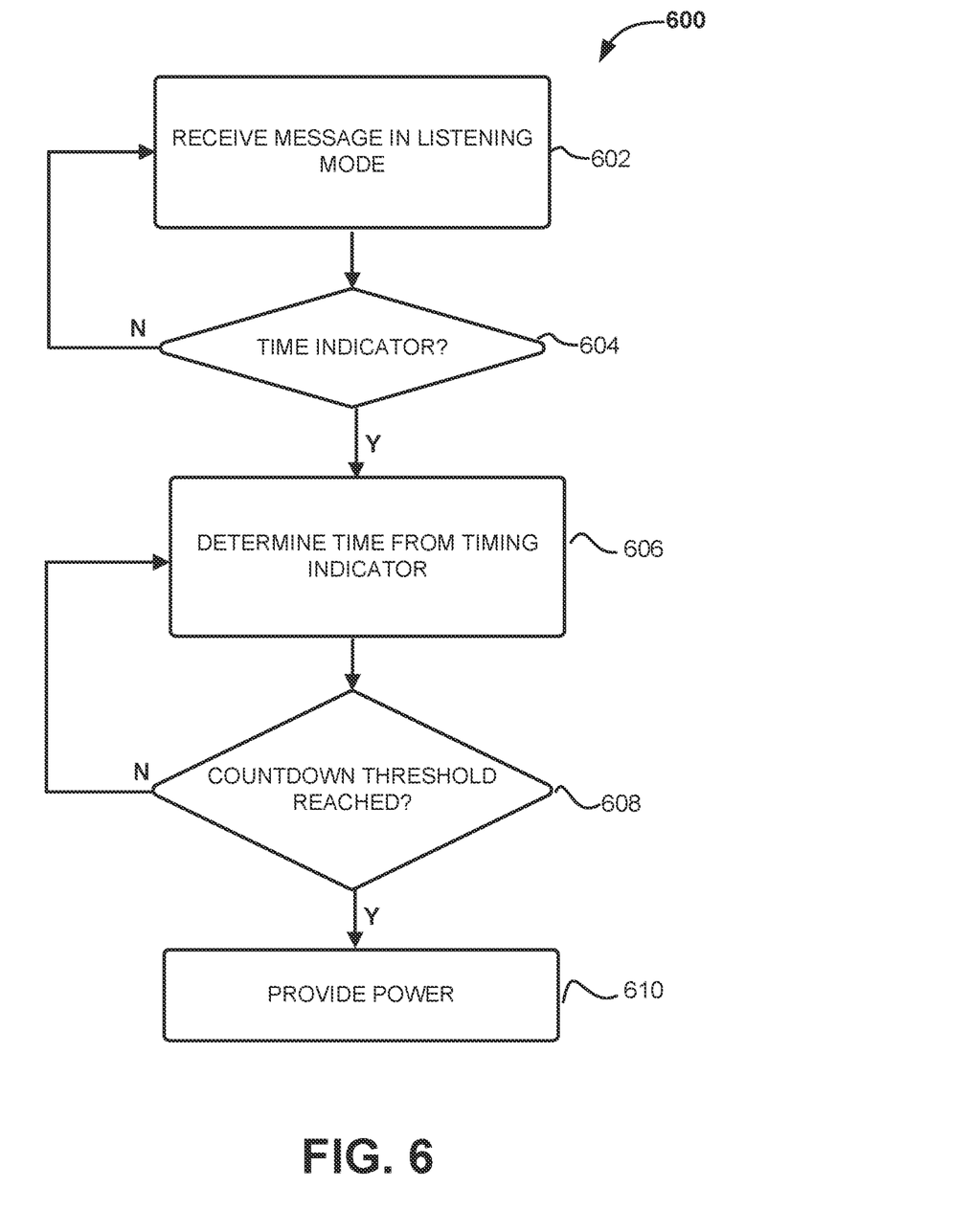
FIG. 6 illustrates a process flow or method for using a timing indicator for gating parallel power supply units (PSUs) in accordance with at least one embodiment.

FIG. 6 illustrates a process flow or method 600 used for using a timing indicator for gating parallel power supply units (PSUs) in accordance with at least one embodiment. The process flow or method 600 may be performed in each PSU associated with a communication bus and able to provide power parallelly to a computer environment. The process flow or method 600 includes receiving (602) a message in a listening mode in two or more PSUs. A determination (604) may be made that the message is associated with a timing indicator. For example, a 11-bit value of an identifier in the message may be indicative of a randomized delay response from a responding PSU to a request from a requesting PSU, through a communication bus. Therefore, the message may be associated with a timing indicator based in part on the randomized delay-such as a time taken by the responding PSU to provide the message using the same priority 11-bit value of the identifier. Alternatively, for example, a data field of the message may include the timing indicator along with a predetermined or custom identifier indicating that the message has a timing indicator. However, heartbeat messages may have a different identifier and may not be treated as having a timing indicator.

The process flow or method 600 includes determining (606) a time from the timing indicator by the above-described different calculation from a requesting message to a receiving message being based in part on a randomized delay or by simply using an express timing indicator of the data field. A countdown may be performed and a determination or verification (608) for a countdown threshold being reached may be made. The PSUs performing the process flow or method 600 that are ready to start-up and that complete step 608 may then provide (610) power to the computer environment.

In at least one embodiment, a communications controller interfacing with a processor in a controller device of each PSU performs the receiving (602) step and the determining (604) step for the timing indicator. In at least one embodiment, the processor of the controller device in each PSU can perform the further determining (606) step for the time and can perform the countdown associated with the subsequent determination or verification (608) step. The processor can also coordinate the providing (610) step for the power to the computer environment.

FIGS. 1 and 2 illustrate example systems for performing the disclosure herein in accordance with at least one embodiment. The computer environment of these example systems may include computing devices such as personal computers, tablets, ultrabooks, smartphones, cell phones, wearable watches and related devices, handheld messaging devices, laptop computers, set-top boxes, personal data assistants, electronic book readers and the like. Further, the computer environment can be supported by a network that can include any appropriate network, including an intranet, the Internet, a cellular network, a local area network or any other such network or combination thereof.

The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of computer network and/or environment selected. Protocols and components for communicating via such a network are appreciated to one of ordinary skill in the art based at least in part on the disclosure herein. Communication over the network can be enabled via wired or wireless connections and combinations thereof.

In a computer environment, each server can include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

In at least one embodiment, in a computer environment, various components or a set of basic components may be provided for a computing device. The computing device can include at least one processor for executing instructions that can be stored in a memory device or element. As would be apparent to one of ordinary skill in the art, upon reading this disclosure, that the computing device can include many types of memory, data storage or computer-readable media, such as a data storage for program instructions for execution by the processor. The same or separate storage can be used for images or data, and a removable memory can be available for sharing information with other devices. Further, any number of communication approaches can be available for sharing the information with other devices.

In at least one embodiment, each PSU or a group of PSUs of a same communications bus may be associated with a computing device, such as at least a computing device described for the computer environment. Furthermore, it would also be apparent to one of ordinary skill, upon reading this disclosure, that a processor as described herein may be multiple processors, each with processing tasks for the embodiments here, and may collectively act as a processor for the embodiments herein. Further, a computing device may be used to control start-up of a group of PSUs.

A computing device associated with a PSU may include at least one type of screen or display element, such as a touch screen, electronic ink (e-ink), organic light emitting diode (OLED) or liquid crystal display (LCD), although devices such as portable media players might convey information via other means, such as through audio speakers. The computing device can include at least one input device that is available to receive conventional input from a user. This conventional input can include, for example, radio-communications type wand devices, hand or gesture sensors, a push button, touch pad, touch screen, wheel, joystick, keyboard, mouse, trackball, keypad or any other such device or element whereby a user can input a command to the device. The conventional input, in one example, interfaces with a user interface (UI) to move pointers or indicators on the UI, as in the case of the finger or stylus. One more of the additional input device, in an example, is connected to the computing device by a wireless IR or Bluetooth® or other link. In an embodiment, the computing device might not include any buttons at all and might be controlled only through a combination of visual and audio commands such that a user can control the computing device without having to be in contact with the computing device.

Furthermore, the computing device includes, in another example, communication component representing various communication features for the computing device to commute with near and far devices. For example, using Bluetooth®, Wi-Fi®, and other communication protocols. The example computing device similarly includes at least one audio capture component, such as a mono or stereo microphone or microphone array, operable to capture audio information from at least one primary direction. A microphone can be a uni- or omni-directional microphone as known for such devices.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture so that a group of PSUs may be caused to start-up remotely. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). A language such as WSDL allows for functionality such as the automated generation of client-side code in various SOAP frameworks.

Most embodiments herein utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business map servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

A computer environment herein can include a variety of databases and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
   a plurality of power supply units (PSUs) to parallelly provide power for computers in a server rack; and
   a plurality of controller devices able to at least one packet, comprising a timing indicator, from individual controller devices of the plurality of controller devices, the individual controller devices of the plurality of controller devices within individual PSUs of the plurality of PSUs, wherein communication between the plurality of controller devices is based on one of the individual controller devices winning an arbitration to send the at least one packet from one of the individual controller devices through a communication bus to remaining ones of the plurality of controller devices, and wherein the PSUs are to provide the power, at a substantially same time by two or more of the PSUs, based on the timing indicator.

2. The system of claim 1, wherein the plurality of controller devices is further configured to:
   perform a countdown in individual internal clocks based on the timing indicator; and
   enable startup of the individual PSUs at a time that is within a threshold of an end of the countdown.

3. The system of claim 1, wherein the plurality of controller devices is further configured to:
   start the individual PSUs in individual broadcast modes to transmit individual packets for arbitration in the communication bus at one or more different times relative to each other; and
   switch the individual PSUs to individual listening modes to monitor for the at least one packet comprising the timing indicator.

4. The system of claim 1, wherein the plurality of controller devices is further configured to:
   synchronize individual timers based on an initial communication before the arbitration or based on the communication associated with the winning of the arbitration between the plurality of controller devices.

5. The system of claim 1, further comprising:
   individual randomizers to determine individual timing indicators to be comprised in individual packets for the arbitration, the plurality of controller devices to attempt to transmit the individual packets together, on the communication bus, to cause the arbitration.

6. The system of claim 1, wherein the plurality of controller devices is further to:
   determine that at least one of the plurality of PSUs is in a fault state; and
   delay the arbitration for a threshold period.

7. A method comprising:
   enabling communication between a plurality of controller devices of different power supply units (PSUs) based on at least one of the plurality of controller devices winning an arbitration to send at least one packet comprising a timing indicator from an individual one of the plurality of controller devices through a communication bus to remaining ones of the plurality of controller devices, wherein individual controller devices of the plurality of controller devices are able to send the at least one packet; and
   providing power, at a substantially same time by a plurality of the different PSUs, from the different PSUs based on the timing indicator.

8. The method of claim 7, wherein the timing indicator is an automated random value, wherein the timing indicator is used in the individual controller devices to delay individual PSUs of the different PSUs from providing the power, and wherein an end of the delay allows the individual PSUs to provide the power at the substantially same time.

9. The method of claim 7, further comprising:
performing a countdown in individual internal clocks of the plurality of controller devices based on the timing indicator; and
enabling the power to be provided from individual PSUs of the different PSUs at a time that is within a threshold of an end of the countdown.

10. The method of claim 7, further comprising:
starting individual PSUs of the different PSUs in individual broadcast modes to transmit individual packets for arbitration in the communication bus at one or more different times relative to each other; and
switching the individual PSUs to individual listening modes to monitor for the at least one packet comprising the timing indicator.

11. The method of claim 7, further comprising:
synchronizing individual timers based on an initial communication before the arbitration or based on the communication associated with the winning of the arbitration between the plurality of controller devices.

12. The method of claim 7, further comprising:
using individual randomizers associated with the individual controller devices to determine individual timing indicators to be comprised in individual packets for the arbitration, the plurality of controller devices to attempt to transmit the individual packets together, on the communication bus, to cause the arbitration.

13. The method of claim 7, further comprising:
determining that at least one of the different PSUs is in a fault state; and
delaying the arbitration for a threshold period.

14. The method of claim 7, further comprising:
broadcasting a periodic heartbeat message comprising a status word from the individual controller devices, wherein the individual controller devices monitor a presence of other ones of the individual controller devices by monitoring the status word.

15. The method of claim 14, further comprising:
checking for errors in a system based on the status word of the periodic heartbeat, wherein a receipt or an absence of the receipt of the status word is part of the checking for the errors in the system.

16. A system comprising:
a plurality of controller devices coupled to a communication bus and associated with respective ones of a plurality of power supply units (PSUs), wherein the plurality of controller devices are to communicate with each other based on at least one of the plurality of controller devices winning an arbitration to send at least one packet comprising a timing indicator from an individual one of the plurality of controller devices through the communication bus to remaining ones of the plurality of controller devices, wherein individual controller devices of the plurality of controller devices are able to send the at least one packet, and wherein the plurality of PSUs are to provide power, at a substantially same time by two or more of the PSUs, to a computer environment based on the timing indicator.

17. The system of claim 16, wherein the timing indicator is an automated random value, wherein the timing indicator is used in the individual controller devices to delay individual PSUs of the plurality of PSUs from providing the power, and wherein an end of the delay allows the individual PSUs to provide the power at the substantially same time.

18. The system of claim 16, further comprising:
individual randomizers in the individual controller devices to determine individual timing indicators to be comprised in individual packets for the arbitration, the plurality of controller devices to attempt to transmit the individual packets together, on the communication bus, to cause the arbitration.

19. The system of claim 16, wherein the plurality of controller devices is further configured to:
determine that at least one of the plurality of PSUs is in a fault state; and
delay the arbitration for a threshold period.

20. The system of claim 16, wherein the plurality of controller devices is further configured to:
broadcast a periodic heartbeat message comprising a status word from the individual controller devices, wherein the individual controller devices monitor a presence of other ones of the individual controller devices through by monitoring the status word.

* * * * *